Figure 1:
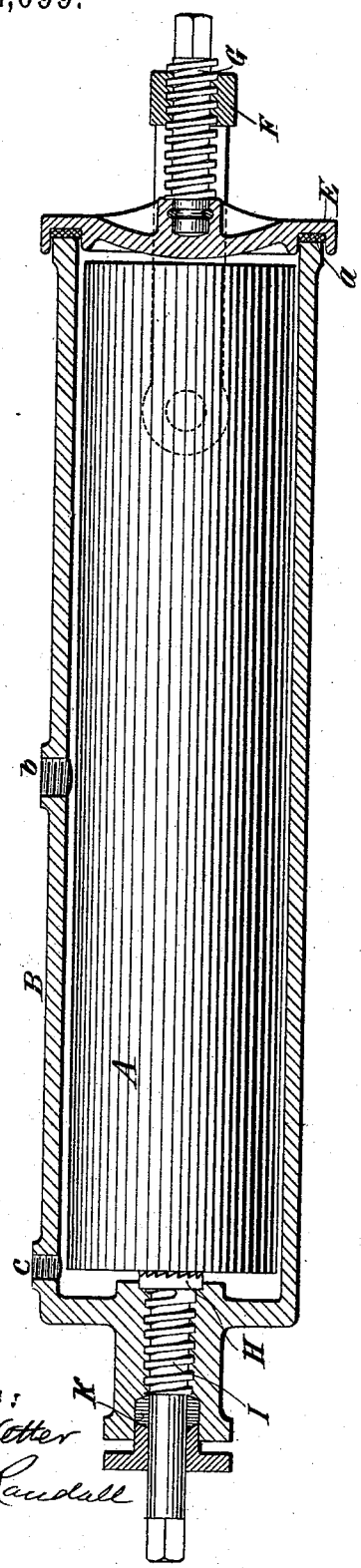

(No Model.) 2 Sheets—Sheet 1.

W. C. CLARKE.
APPARATUS FOR GENERATING GAS.

No. 552,099. Patented Dec. 31, 1895.

Witnesses:
Raphael Netter
Sueds F. Randall

Inventor
William C. Clarke
by Clarkson A. Collins
Attorney.

ANDREW B. GRAHAM, PHOTO-LITHO, WASHINGTON, D.C.

(No Model.) 2 Sheets—Sheet 2.

W. C. CLARKE.
APPARATUS FOR GENERATING GAS.

No. 552,099. Patented Dec. 31, 1895.

Witnesses:
Raphael Netter
Sands F. Randall

Inventor
William C. Clarke
by Clarkson A. Collins
Attorney.

UNITED STATES PATENT OFFICE.

WILLIAM C. CLARKE, OF NEW YORK, N. Y.

APPARATUS FOR GENERATING GAS.

SPECIFICATION forming part of Letters Patent No. 552,099, dated December 31, 1895.

Application filed October 29, 1894. Serial No. 527,175. (No model.)

*To all whom it may concern:*

Be it known that I, WILLIAM C. CLARKE, a citizen of the United States, residing in the city of New York, in the county and State of New York, have invented certain new and useful Improvements in Apparatus for Generating and Supplying Illuminating-Gas, of which the following is a specification.

My invention relates particularly to the lighting by gas of small isolated plants, which by reason of their situation cannot ordinarily receive gas from the central plants located in large towns—such as railway-cars, vessels, floating buoys, country-houses or lamps on country-roads. Means have heretofore been devised for utilizing gas to a limited extent in such situations. Thus country-houses are lighted by means of the so-called "gasoline gas machines," and railway-cars by filling reservoirs attached to the cars with gas produced at a large central plant. Neither of these systems, however, nor any other heretofore devised, so far as I am aware, is universally applicable for lighting isolated plants, whatever their nature or situation, and they are subject to certain restrictions within the fields to which they are applicable. Thus the system of lighting cars referred to has the disadvantage that the car can be lighted only until the supply of gas becomes exhausted, when either other means of lighting must be resorted to or the car must be brought into connection with a gas-producing plant for a fresh supply.

The object of my improvements is to provide means for generating and applying gas for lighting which shall provide for the continuous lighting of such plants as I have referred to in a simple, safe and economical manner.

To this end I propose to generate the gas at or near the point of use—as upon a car, vessel or other moving vehicle, or in the immediate vicinity of a fixed point to be lighted—by bringing together water and a material which upon contact therewith will produce a fixed carbonaceous gas, and I have hereinafter shown and claimed, and my invention comprises certain means for the practical utilization of such materials for the purpose intended. Such a material is the substance known as "carbide of calcium," which has the property of being rapidly decomposed when brought in contact with water, giving as the products of decomposition a comparatively bulky residue of lime and a richly carbonaceous fixed gas, which burns with a flame of great brilliance and luminosity, and can be subjected to pressure without appreciable loss of its illuminating power, and while I may use other materials of like nature for the production of gas, I have described my invention herein in connection with the use of such carbide of calcium, which in certain respects is particularly adapted for my purposes. The practical application of such a material however presents certain difficulties which have to be provided for. Thus if a liquid and a solid, which when brought in contact will by their mutual decomposition produce a gas, are brought freely together in mass in a generator, by introducing first one and then the other therein, the gas may be produced with such rapidity that a considerable proportion of the gas will escape before the generator can be closed, with a consequent loss of gas and danger of explosion. This is notably the case with the carbide of calcium above referred to, the contact of which with water results in the instantaneous production of a great volume of gas. The residue of decomposition of this material is also bulky, malodorous and difficult to remove from a generator when allowed to accumulate loose therein. To the end of obviating these difficulties I provide in the first instance a hermetically-closed case or cartridge, which is filled with the calcium carbide to be used in a dry state. The cartridge may be composed of cardboard, papier-maché or other suitable material, which while normally impervious to moisture may be readily perforated for the purpose of admitting water therein. In order to utilize the material in the production of gas a cartridge charged therewith is inserted into a vessel which I call a "generator," which is then closed so as to be gas-tight. The cartridge either before or after being placed in the generator is preforated so as to admit water to the contents. Water is then admitted to the generator and when it has risen to the level of the perforation or perforations in the cartridge will begin to enter the cartridge and upon its coming in contact with the contents of the cartridge the gas will begin to be developed.

Since, however, the water can enter the cartridge but slowly, its entrance moreover being checked by the outward pressure of the gas first generated, the generation of gas will not at first be rapid and the operation of filling and closing the generator can be completed without the loss of any appreciable quantity of gas. The gas as formed by its own pressure passes over into a second vessel or receiving-chamber and thence by the usual gas-pipes to the burners. A check-valve should be placed between the generator and the receiving-chamber to prevent the backflow of gas and the gas should pass through a pressure-regulator after leaving the receiving-chamber in order to insure a proper pressure at the burners. After the calcium carbide has developed its full equivalent of gas, the residuum of lime and water may be easily withdrawn from the generator by withdrawing the cartridge, when a new cartridge can be inserted and a fresh supply of water admitted, and the operation can be repeated as often as required.

The invention will be better understood by reference to the accompanying drawings, in which the apparatus is shown in its application to the lighting of an ordinary railway-car.

Figure 2:
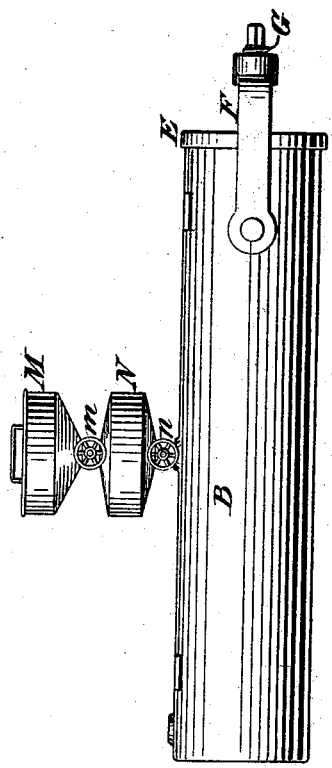
Figure 3:
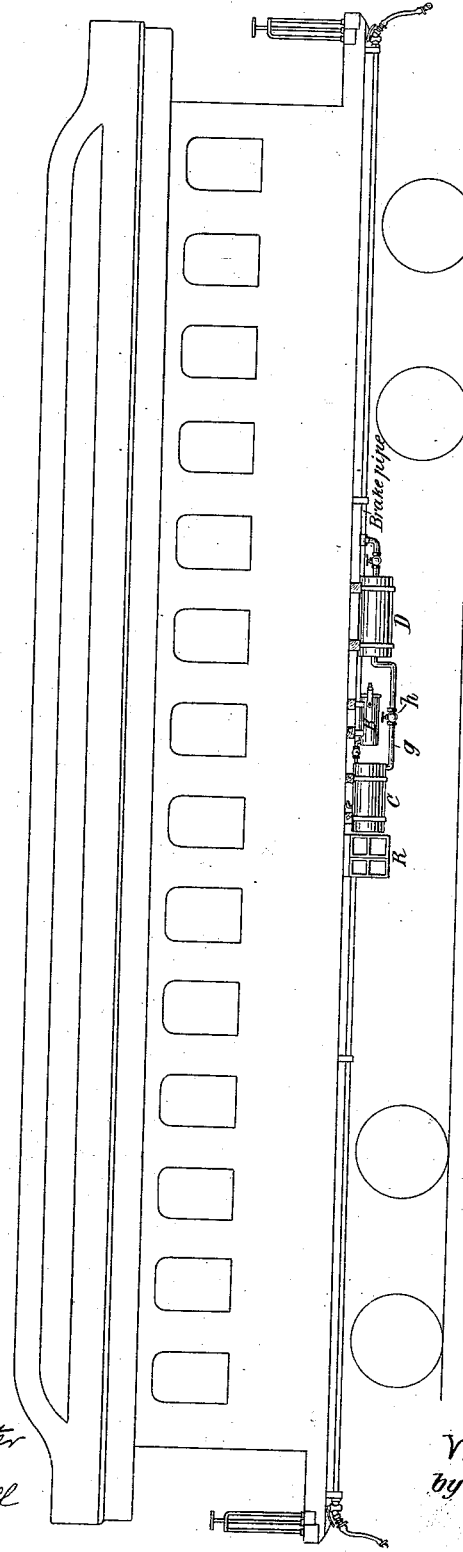
Figure 4:
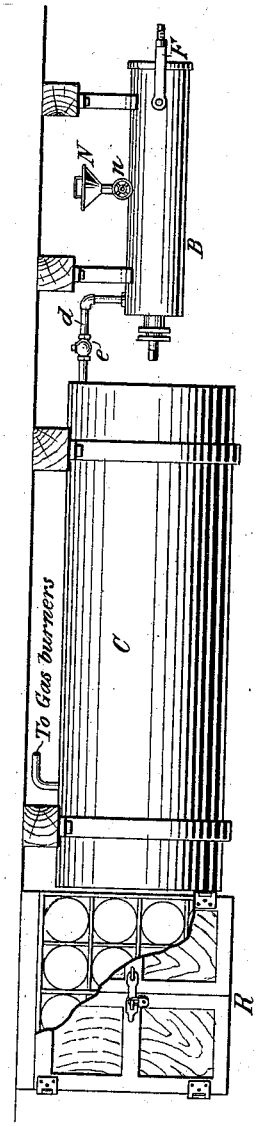

Figure 1 of the drawings shows a section of a generator with a cartridge inserted and means for perforating the cartridge after it is placed in the generator. Fig. 2 shows an elevation of a generator with a double funnel for the admission of water intended to be used where the cartridge is perforated before its insertion in the generator. Fig. 3 shows an elevation of a car with a generator and receiving-chamber attached thereto, together with means for mixing air with the gas; and Fig. 4 shows an elevation on a large scale of a generator and receiver attached to a car-bottom without the air-mixing device.

Referring to the drawings, A indicates a case or cartridge which is filled with the carbide of calcium and sealed against access of air or moisture. It may be made of cardboard, papier-maché, thin sheet metal, or other similar material, which, while air and moisture proof, may itself readily be perforated or cut open, or it may be provided with thinner portions at which cuts or perforations can be made, or with openings sealed or closed with some material, such as paper or glue, which, while normally impervious to moisture, will be removed or dissolved by contact with water in quantity, thus admitting the water to the contents of the cartridge.

B is a cylinder which may be made of iron or steel securely attached to the bottom of the car and forming, in conjunction with the cartridge, the gas-generator. It is provided with a lid E, which is swung into place and securely fastened by means of the swinging clamp F and screw G. A rubber ring $a$ between the lid E and the edge of the generator B forms a gas-tight seal. $b$ and $c$ are threaded apertures in the generator B, at which are attached, respectively, a pipe for the admission of water to the generator and a pipe leading from the generator to the gas-receiver C.

In case it is desired to perforate the cartridge after its insertion in the generator, the generator is provided with a cutting or perforating device, which may be of the form shown in Fig. 1, wherein it is shown as consisting of a circular knife H provided with saw-tooth cutting-edges, which is revolved and pressed against the cartridge by means of a screw-shaft I, surrounded with a packing K to prevent the escape of gas. Other forms of cutting and perforating devices, which will readily occur to those skilled in the art, may, however, be employed.

In case it is desired to perforate the cartridge before placing it in the generator or to use a cartridge having perforations closed with soluble material, the cutting device is omitted, as is shown in Fig. 2. In this case, in order to prevent any possible escape of gas during the admission of water into the generator, the double funnel M N, (shown in Fig. 2,) may be employed, the water being admitted into the funnel N, and the cock $m$ being closed before the cock $n$ is opened to permit the passage of water into the generator. From the generator B a pipe $d$ leads into a second cylinder C, which constitutes a receiving or storage chamber for the gas and from which a pipe leads to the burners in the car. The pipe $d$ is provided with a check-valve $e$ to prevent the backflow of gas from the receiving-chamber to the generator. In case it is desired to mix air with the gas a cylinder D may be provided which receives air under pressure from the brake-pipe on the car and is connected with the receiving-chamber C by the pipe $g$, provided with the valve $h$, whereby air in any desired proportion may be admitted into the gas-receiving chamber.

In order to generate gas, a cartridge charged with the carbide of calcium is inserted in the generator B, and the lid E is swung into place and made fast. The generator is then filled with water through the funnel N and the valve $n$ is closed. The cartridge may, if desired, be perforated or cut open before being placed in the generator. In case this is not done, or a cartridge having perforations closed with soluble material is not used, the cartridge is then perforated by means of the device shown in Fig. 1. The water in the generator slowly enters the cartridge through the perforations and as it comes in contact with the contents thereof the gas is developed and by its own pressure passes over into the chamber C, its return being prevented by the check-valve $e$. When the gas-developing power of the contents of the cartridge is exhausted, the generator is opened and the contents removed and a fresh cartridge inserted and this is repeated as often as required.

As shown in the drawings, the gas-receiving chamber C is made materially larger than the generating-chamber B, and by the use of successive cartridges a very considerable supply of gas under a high pressure may be accumulated in the receiving-chamber, the check-valve e operating to prevent any escape of gas when the generator is opened.

A supply of cartridges ready for use may be carried in the rack R under the car or in the baggage-car or other convenient place.

The relative sizes of the generator and the cartridge to be used should be such that when the gas-generating power of the materials is exhausted the generator will be as nearly as possible full of the residue, so that all or nearly all of the gas will be forced over into the receiving-chamber, thus preventing the presence and consequent loss of any material quantity of gas when the generator is opened to insert a fresh cartridge. In other words the size of the inclosing chamber is made to conform as nearly to that of the cartridge placed therein as is consistent with the admission thereto of the quantity of water necessary to the decomposition of the carbide in the cartridge, so that when the carbide is decomposed the chamber will be as nearly as possible filled with solid material and a minimum gas-space will be left therein.

By the use of a cartridge or inclosing envelope for the carbide of calcium, I not only prevent loss of gas through retarding the contact of the water with the contents of the cartridge, but at the same time I provide a convenient means of introducing a measured quantity of material to the generator, thus determining the pressure of the gas evolved as well as of removing the contents of the generator in a cleanly and expeditious manner. In this way also the material can be more conveniently transported and handled than in bulk and is protected from the decomposing effect of the moisture in the air while awaiting use.

I have illustrated and described my invention herein in connection with supplying gas for lighting a railway-car. I do not, however, intend to limit its use in this respect, as it may evidently be employed in other situations, as upon steam or sailing vessels or buoys, or in houses, with great advantage.

A complete gas-supplying plant made in accordance with my invention may be installed in the body of a lamp-post for street-lighting, and the amount of material supplied may be so graduated as to run the light for a predetermined number of hours. The details of the apparatus may also be largely varied without departing from my invention.

While I prefer to use the carbide of calcium, together with water, as the materials to be used in generating gas, on account of the comparative cheapness of the materials and the brilliance of the flame produced, it is evident that other substances of like nature, which will produce an illuminating-gas in the same manner, may be used in carrying my invention into effect.

What I claim as new, and desire to secure by Letters Patent, is—

1. As a new article of manufacture for use in the production of illuminating gas a cartridge having a perforable shell normally impervious to moisture, containing a substance decomposable upon contact with the atmosphere and operating upon contact with water to generate an illuminating gas.

2. A cartridge having a perforable shell normally impervious to moisture, containing a substance decomposable upon contact with the atmosphere and operating upon contact with water to generate an illuminating gas, in combination with an inclosing chamber conforming in size to the contained cartridge, and provided with a charging door, and water inlet and gas outlet openings, substantially as and for the purposes described.

3. A cartridge having a perforable shell normally impervious to moisture, containing a substance decomposable upon contact with the atmosphere and operating upon contact with water to generate an illuminating gas, in combination with an inclosing chamber conforming in size to the contained cartridge and provided with a charging door and a water inlet, and a gas receiving chamber materially larger than such cartridge inclosing chamber and connected therewith by a pipe provided with a check valve closing toward such inclosing chamber whereby gas may be generated, and stored under pressure, substantially as and for the purposes set forth.

In testimony whereof I have hereunto subscribed my name this 26th day of October, A. D. 1894.

WILLIAM C. CLARKE.

Witnesses:
CLARKSON A. COLLINS,
SANDS F. RANDALL.